US006558214B2

(12) United States Patent
Nanami

(10) Patent No.: US 6,558,214 B2
(45) Date of Patent: May 6, 2003

(54) ENGINE ARRANGEMENT FOR SMALL PLANING WATERCRAFT

(75) Inventor: Masayoshi Nanami, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/928,422

(22) Filed: Aug. 14, 2001

(65) Prior Publication Data

US 2001/0055924 A1 Dec. 27, 2001

Related U.S. Application Data

(63) Continuation of application No. 09/406,099, filed on Sep. 27, 1999.

(51) Int. Cl.[7] .......................... B63H 21/10; B60K 41/00
(52) U.S. Cl. ............................................ 440/88; 440/87
(58) Field of Search ............................... 440/87, 88, 89

(56) References Cited

U.S. PATENT DOCUMENTS

| | | | | | |
|---|---|---|---|---|---|
| 4,643,272 | A | * | 2/1987 | Gaffrig | 181/260 |
| 4,856,486 | A | * | 8/1989 | Mori et al. | 123/572 |
| 4,911,122 | A | | 3/1990 | Corbett et al. | 123/216 |
| 4,986,780 | A | | 1/1991 | Sougawa | 440/89 |
| 5,022,877 | A | * | 6/1991 | Harbert | 440/89 |
| 5,634,832 | A | * | 6/1997 | Nakase et al. | 440/88 |
| 5,778,857 | A | | 7/1998 | Nakamura et al. | 123/425 |
| 5,782,214 | A | | 7/1998 | Nanami et al. | 123/65 |
| 5,816,205 | A | | 10/1998 | Moriya | 123/90.17 |
| 6,015,320 | A | | 1/2000 | Nanami | 440/88 |
| 6,027,384 | A | | 2/2000 | Nitta et al. | 440/75 |
| 6,041,647 | A | | 3/2000 | Matsuoka | 73/116 |
| 6,068,530 | A | | 5/2000 | Ozawa | 440/89 |
| 6,076,492 | A | | 6/2000 | Takahashi | 123/90.17 |
| 6,135,834 | A | * | 10/2000 | Polakowski | 440/89 |
| 6,220,907 | B1 | * | 4/2001 | Shimizu | 440/89 |

* cited by examiner

*Primary Examiner*—S. Joseph Morano
*Assistant Examiner*—Andrew Wright
(74) *Attorney, Agent, or Firm*—Bacon & Thomas, PLLC

(57) ABSTRACT

A small planing watercraft including a hull, a propulsion unit mounted on the hull and a high RPM-high output engine for driving the propulsion unit, wherein the engine includes at least one intake valve and an intake valve timing control system for advancing the opening and closing of the intake valve when the watercraft is operating below a predetermined speed corresponding to a velocity at which the watercraft transitions from non-planing to planing motion. The engine may also include a long air intake passage for low-speed operation and a short air intake passage for high-speed operation, with an air intake control valve in the short air intake passage that is closed when the watercraft is operating below the predetermined speed. The engine may also include an exhaust control valve for constricting the exhaust passage, and a system for at least partially closing the exhaust control valve when the watercraft is operating below the predetermined speed. The invention increases the lower RPM output of a high RPM-high output engine to enable faster transition of the watercraft between non-planing and planing operations. Engine intake air flows over the intake valve timing control to provide a cooling effect.

8 Claims, 9 Drawing Sheets

F/G. 2

ENGINE ARRANGEMENT FOR SMALL PLANING WATERCRAFT

This application is a continuation of application Ser. No. 09/406,099 filed on Sep. 27, 1999.

BRIEF SUMMARY OF THE INVENTION

The present invention addresses these and other drawbacks of conventional technology by providing a small planing watercraft with a high-RPM, high-output engine which can make a smooth transition from non-planing to planing movement. The watercraft includes a hull or shell, a propulsion unit arranged in the hull, and an engine arranged in an engine compartment in the hull for directly driving the propulsion unit. The engine includes an exhaust passage, at least one air intake valve, an air intake valve camshaft for opening and closing the air intake valve, and valve timing control means for advancing the normal closure of the air intake valve when the watercraft and engine are operating below a predetermined speed or RPM at which the watercraft transitions from non-planing motion to planing motion. The predetermined speed of the watercraft is directly related to a predetermined engine RPM.

The valve timing control means may include a toothed intake camshaft drive pulley mounted on the end of the intake valve camshaft and operatively connected (e.g., by a toothed belt) with the crankshaft for rotation therewith, and means for selectively rotating the pulley relative to the intake camshaft for advancing the closure of the air intake valve when the engine is operating below the predetermined speed. More particularly, the selective rotating means may include an inner shaft fixed on the end of the intake valve camshaft and having helical splines arranged on its outer surface. An annular sliding piston is slidably arranged around the inner shaft with helical splines on its inner surface for engaging the splines on outer surface of the inner shaft. The piston also has oppositely twisted helical splines on its outer surface for engaging similar splines inside an interior cylindrical opening of the pulley. All of the splines are arranged so as to rotate the pulley relative to the camshaft in response to axial translation of the annular piston.

The engine may also include a long air intake passage for low RPM operation and a short air intake passage for high-RPM operation, with an air intake control valve provided in the short air intake passage that includes means for closing the air intake control valve when the watercraft is operating below a predetermined speed. The engine may include an exhaust passage having an exhaust control valve for selectively constricting the exhaust passage by partially closing the exhaust control valve when the watercraft is operating below the predetermined speed.

BRIEF DESCRIPTION OF THE SEVERAL VIEWS OF THE DRAWINGS

Various embodiments of the invention will now be described with reference to the following drawings wherein the same reference numerals are used to refer to the same features in each of the figures.

DETAILED DESCRIPTION OF THE INVENTION

Figure 1:
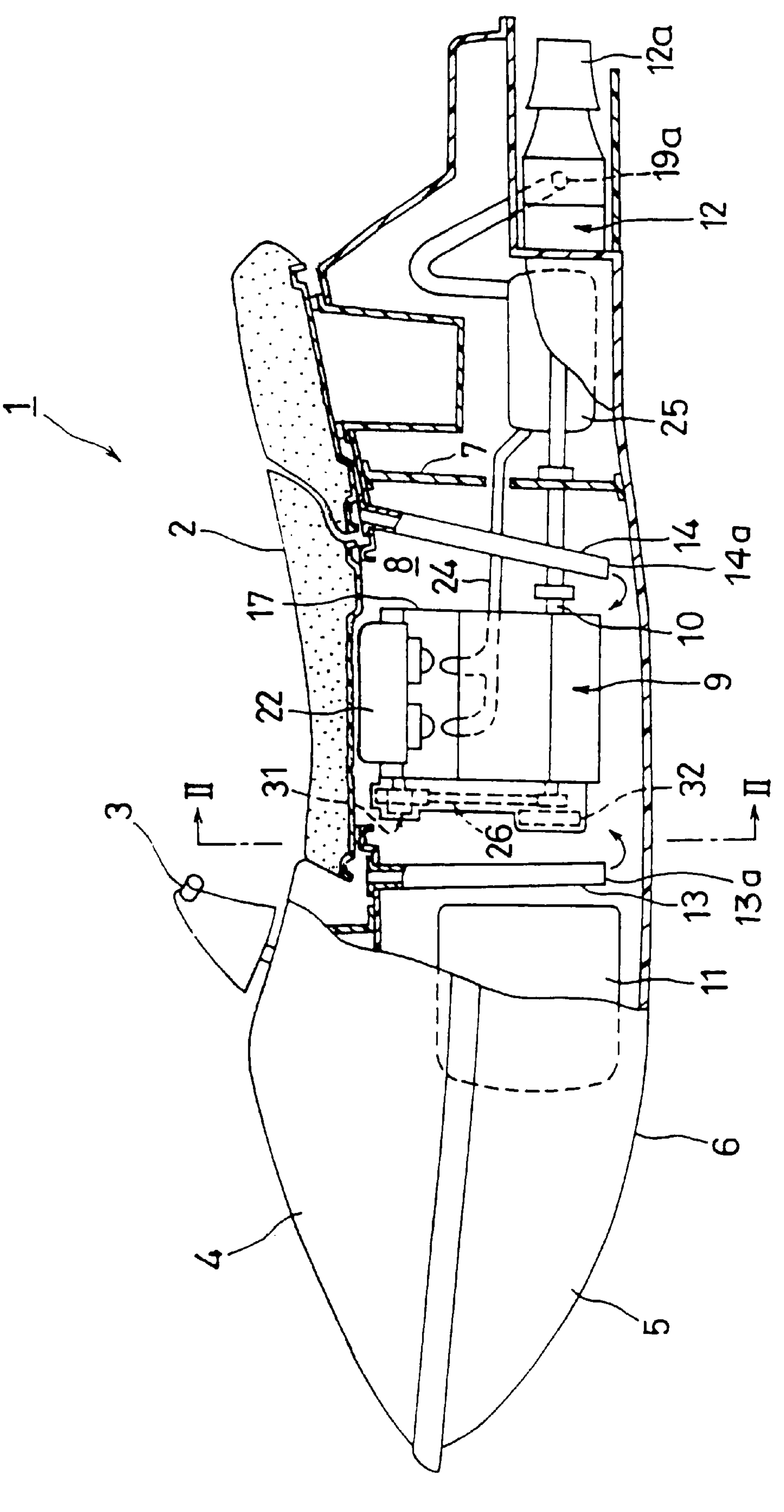
FIG. 1 is a partial cutaway side elevational view of a small planing watercraft including the present invention.

A first embodiment of the present inventions will now be described with reference to FIGS. 1–7. FIG. 1 is a side view of a small planing watercraft 1 which is operated by a rider (not shown) straddling a seat 2 while grasping the handlebars 3 in front of the seat. The watercraft 1 is supported by a hull or shell 6 including an upper deck 4, lower hull 5, and a bulkhead 7 which separates the engine compartment 8 shown in the cutaway portion of FIG. 1. The engine 9 is mounted in the engine compartment 8 near the center of the for-and-aft length of the hull 6. Engine compartment 8 is defined at least in part by upper deck walls 4 and the upper end of engine 9 extends between upper deck walls 4, as shown in FIG. 2.

A fuel tank 11 is mounted in front of the engine 9 and a crankshaft 10 extends aft of the engine toward a conventional jet-type propulsion apparatus 12. Although each of the embodiments discussed below is described with respect to a jet-type propulsion apparatus, an outboard engine or other suitable propulsion apparatus may also be used. Forward and aft outside or fresh air intake ducts 13 and 14 having exit openings 13*a,* 14*a* are arranged near the transverse center of the watercraft 1 so as to draw air into the engine compartment 8 at locations longitudinally spaced in front of and behind the engine 9. The propulsion apparatus 12 includes an impeller (not shown) which rotates at the same speed as the crank shaft 10 in order to pump water through the jet outlet 12*a* to propel the watercraft. The jet outlet 12*a* is then rotated by the moving the handlebars 3 to steer the watercraft.

Figure 3:
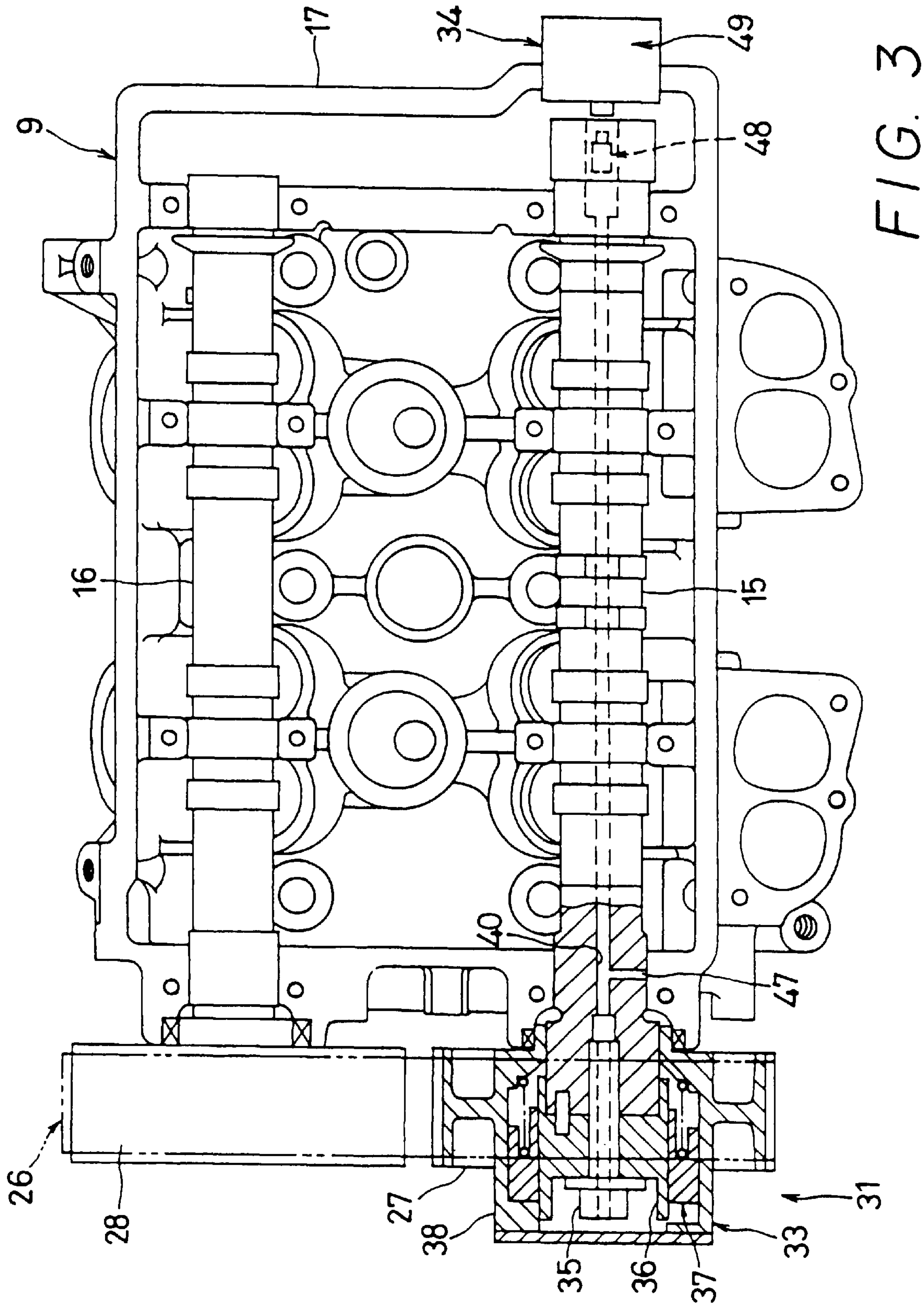
FIG. 3 is a top plan partial sectional view of the cylinder head of the engine shown in FIGS. 1 and 2.

The engine 9 illustrated in the Figures is a water-cooled, twin-cylinder, DOHC-type internal combustion engine. As shown in FIG. 3, it has two intake valves for each cylinder that are operated by an intake valve camshaft 15, and two exhaust valves for each cylinder (not shown) that are operated by an exhaust valve camshaft 16. Each of the camshafts 15 and 16 are installed in the cylinder head 17. The intake valve camshaft 15 is mounted on the port, or left, side of the engine 9 with one end connected to the charge (air and fuel) intake system 18 while the exhaust camshaft 16 is mounted to the starboard, or right, side and is connected to an exhaust manifold 19.

Figure 2:
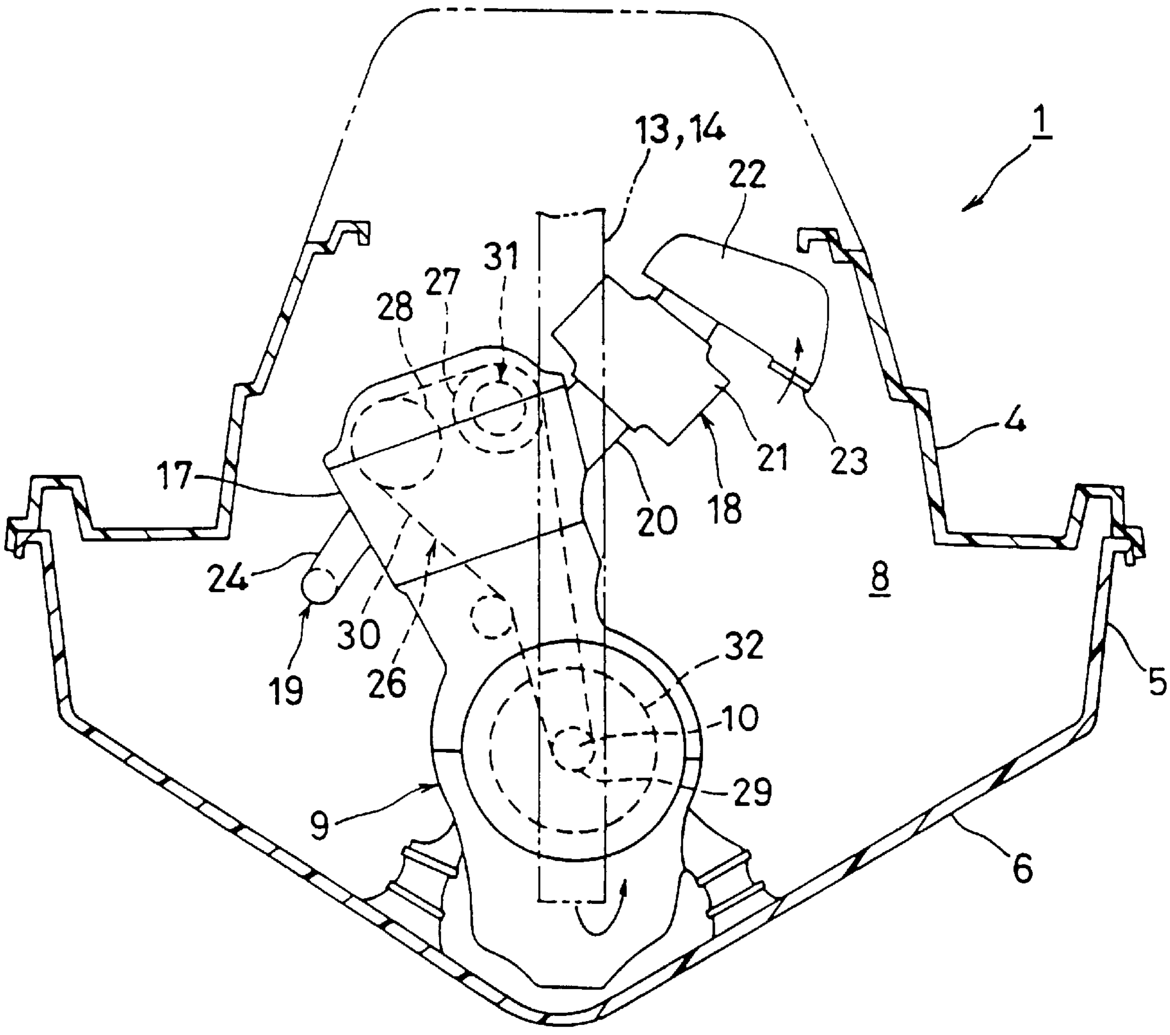
FIG. 2 is a sectional view taken long line II—II in FIG. 1.

As shown in FIG. 2, the intake system 18 includes a carburetor 21 connected by an intake duct 20 to the cylinder head 17. An air intake silencer 22 is arranged upstream of the carburetor 21 on the port side of the watercraft 1 and includes an air intake opening 23 which draws air from inside the engine compartment 8. Air that enters the forward air intake duct 13 exits the opening 13*a* flows upwardly past, and cools, the valve timing control apparatus 31 (discussed below) before entering the air intake opening 23 in the silencer. Similarly, air that enters the aft intake duct 14 flows exits opening 14*a* and flows upwardly and cools the hydraulic pressure control apparatus 34 (also discussed below) enroute to the engine air opening 23.

The exhaust manifold 19 is connected through an exhaust pipe 24 that leads from the cylinder head 17 to the water lock 25 shown in FIG. 1. The water lock 25 expels the exhaust gases into the pump chamber of the propulsion apparatus 12 and then out through the exhaust gas outlet 19*a*. When the hull 6 is operating in a non-planing state, the water jet outlet 12*a* is submerged so that the exhaust gases are expelled underneath the surface of the water. When the hull 6 is operating in a planing state, the water jet outlet 12*a* is positioned above the surface of the water so that the exhaust gases are expelled into the atmosphere.

As shown in FIGS. 1–3, a toothed belt drive apparatus 26 is arranged on the front side of the engine 9 that is connected to and transmits the rotation of the crank shaft 10 to the intake valve camshaft 15 and the exhaust valve camshaft 16. Each of the crank shaft 10, camshaft 15 and camshaft 16 includes a respective toothed pulley 27, 28, and 29, which are engaged and are driven by a toothed belt 30.

As best shown in FIG. 3, a valve timing control apparatus 31 is mounted on the front side of the intake valve camshaft 15, while a flywheel/magneto 32 is mounted on the front side of the crankshaft 10. As described in more detail below, the valve timing control apparatus 31 uses hydraulic pressure to adjust the timing phase of the intake valve camshaft 15 relative to the exhaust camshaft 16, and hence the opening and closing interval of the intake valves relative to the crankshaft rotational angle.

Figure 4:
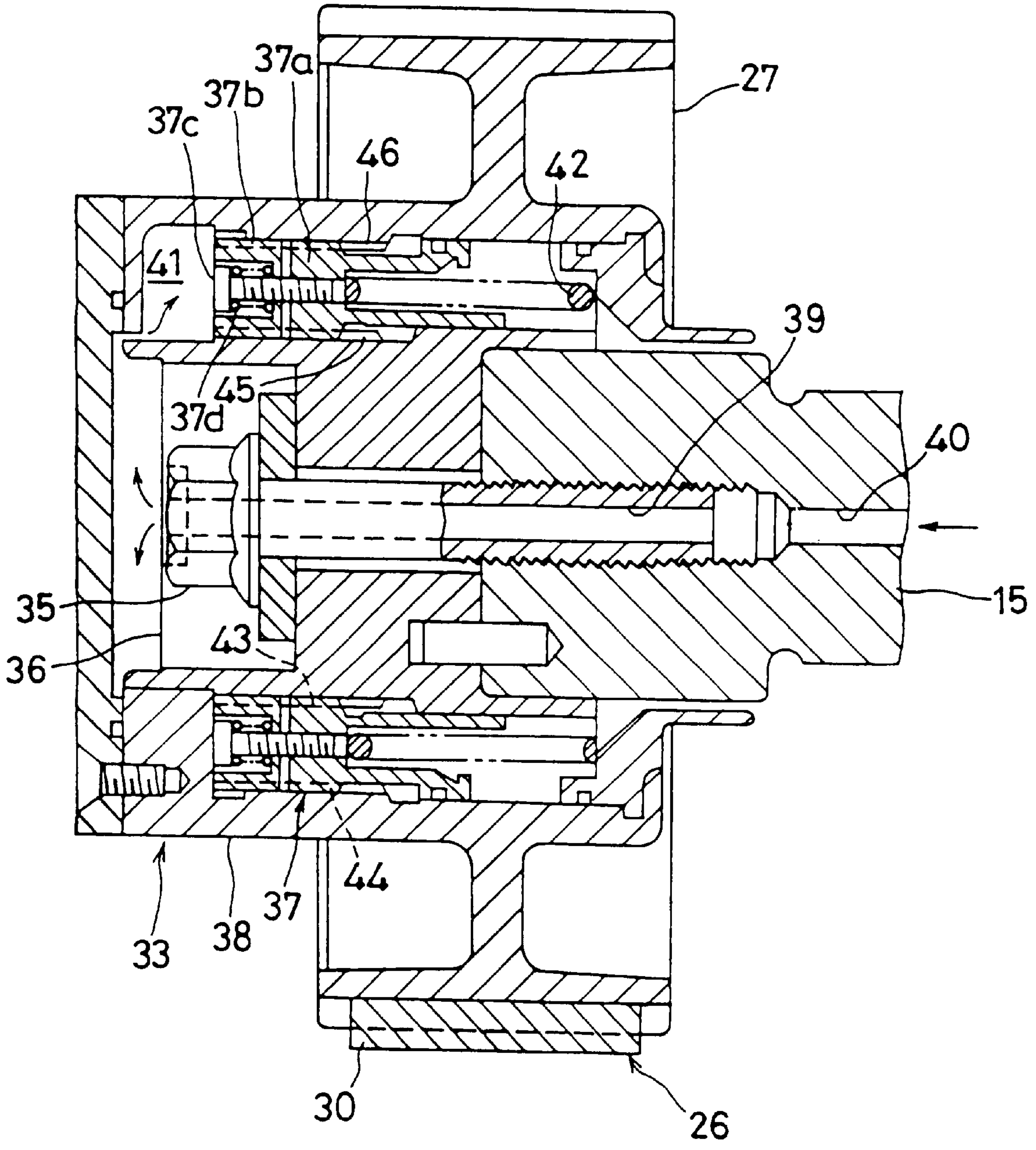
FIG. 4 is an enlarged section view of the valve timing control apparatus.

As shown in FIG. 3, the valve timing control apparatus 31 includes a control or actuating unit 33 arranged on the front end of the intake valve camshaft 15 and a hydraulic pressure control apparatus 34 arranged at the rear end of the intake valve camshaft. As shown in FIG. 4, the control unit 33 includes a bolt 35 which secures an inner shaft 36 to the end of the intake valve camshaft 15. An annular sliding actuating piston 37 slidably fits over the outside of the inner shaft 36 and inside an outer cylinder 38 of the intake valve camshaft pulley 27 which preferably is integrally formed as one piece with the pulley. An oil supply passage 39 is bored through the center of the attachment bolt 35 and on one end communicates with a second oil passage 40 and an engine lubricating oil pressure supply passage 47 formed in the intake valve camshaft 15 as shown in FIG. 3. The opposite end of the oil passage 39 communicates with an oil pressure receiving chamber 41 on the front side of the cylinder 38 so that hydraulic pressure received in the oil pressure receiving chamber 41 will be applied against the face of the sliding piston 37 opposite the camshaft 15.

The actuating piston 37 includes a primary piston 37*a* and a secondary piston 37*b* which are joined by bolts 37*c* and a small compression spring 37*d*. A larger compression coil spring 42 normally urges the sliding piston 37 away from the camshaft 15. Helical splines 43 and 44 twisting in opposite directions are arranged on the inner and outer circumferential surfaces of the sliding piston 37 and mate with corresponding adjacent helical splines 45 and 46 on the outer circumference of the inner shaft 36 and the inner circumference of the cylinder 38, respectively. The helical splines cause the intake valve camshaft 15 to rotate in an advance direction relative to the pulley 27 when the piston 37 is translated in the aft direction. Thus, increased hydraulic pressure in the oil chamber 41 urges the sliding piston 37 to the right in FIG. 4, or aft in the watercraft 1, so as to cause the intake valve camshaft 15 to rotate forward in the same direction as it is rotating through a predetermined angle with respect to the pulley 27.

Figure 5:
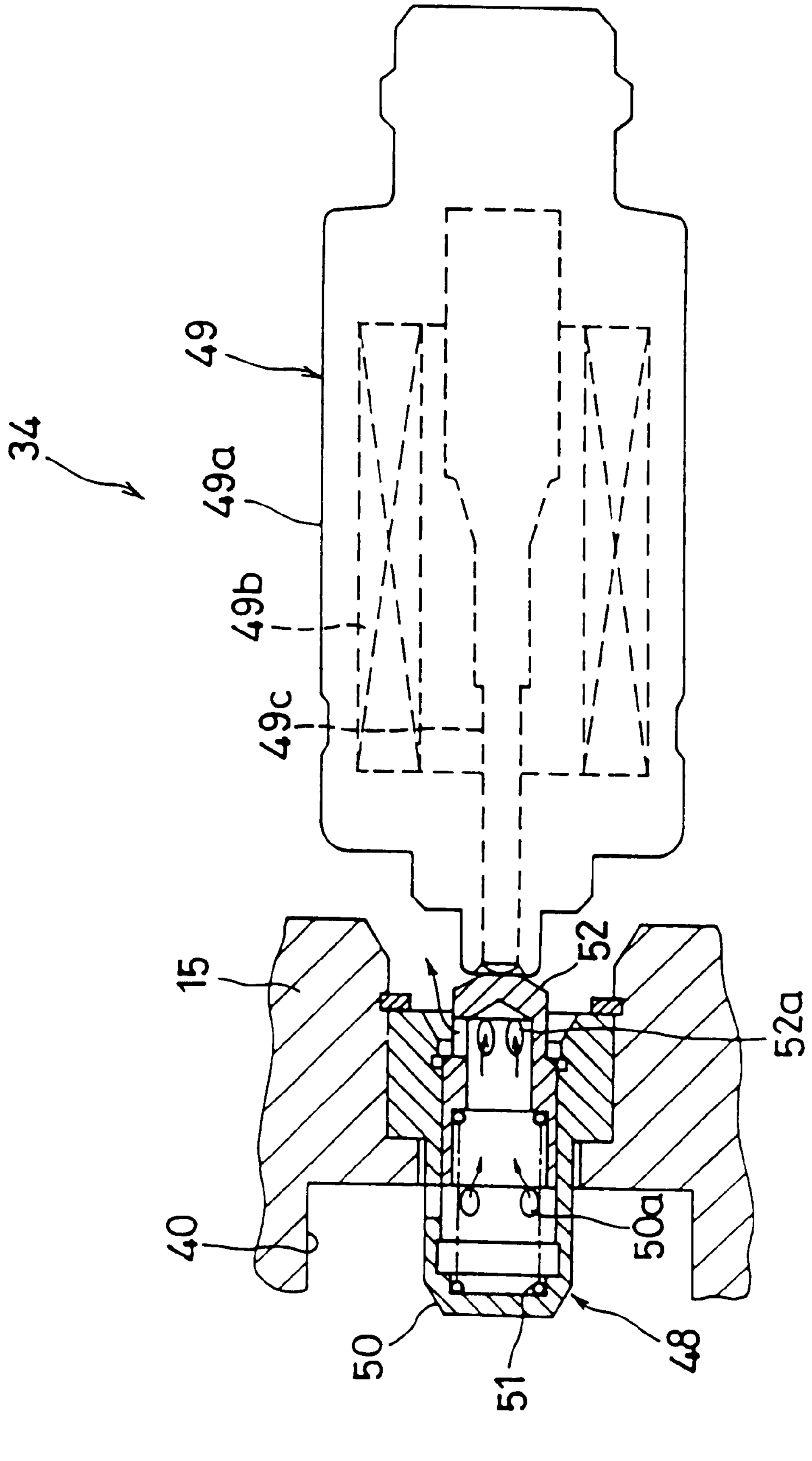
FIG. 5 is a sectional view of a hydraulic pressure control apparatus for use with the valve timing control apparatus.

FIG. 5 illustrates the structure of the pressure control apparatus 34 that selectively drives and releases the sliding piston 37 by opening and closing the engine oil passage 40 inside the intake valve camshaft 15. The pressure control apparatus 34 includes a control valve 48 within a housing 50 which is secured to the aft end of the camshaft 15, and a plunger 52 that slides freely inside the housing against a compression spring 51. FIG. 5 illustrates the plunger 52 in the normal pressure release position at which oil holes 50*a* and 52*a* are in communication so as to allow oil to flow out of the oil passage 40 in which pressurized engine lubricating oil is circulated.

The plunger 52 is selectively driven by a solenoid 49 including a housing 49*a* in which a coil 49*b* into which an armature rod 49*c* is inserted are located. A controller (not shown) senses engine speed (RPM) from the crankshaft 10, camshaft 15 or camshaft 16 and switches the solenoid from an OFF state to an ON state by applying a current to the coil 49*b* while the engine speed is below a certain level. This, in turn, causes the rod 49*c* to move toward the left in FIG. 5, restricting or stopping the flow of oil between oil holes 50*a* and 52*a* and thereby permitting the pressure in passages 39, 40 to be at a high level, and likewise in oil chamber 41. The increased pressure in the oil pressure receiving chamber 41 urges the sliding piston 37 toward the right in FIG. 4 against the force of the coil spring 42.

As the piston 37 moves aft in the watercraft 1, the helical splines 43–46 cause the intake valve camshaft 15 to rotate in a forward direction over a predetermined angle with respect to the pulley 27 which, in turn, advances the timing phase of intake camshaft 15 relative to the exhaust camshaft 16. As discussed in more detail below, this timing change causes the air intake valves to close earlier and to open earlier relative to (overlap longer with) the exhaust valves. In contrast, when the solenoid 49 is in the OFF state at high engine speed above a predetermined RPM, the plunger 52 slides to the right in FIG. 5 so that the engine lubricating oil inside the passage 40 flows through the oil holes 50*a* and 52*a* and into the valve chamber of the cylinder head 17. The ensuing release of pressure in oil chamber 41 allows the intake camshaft 15 to return to its original position by means of spring 42.

Figure 6:
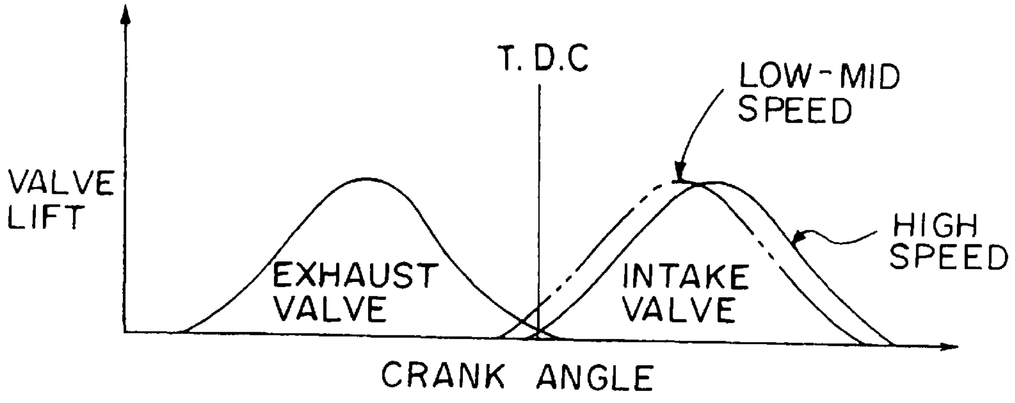
FIG. 6 is a graph showing the relationship between valve position and crank angle.

In the embodiment discussed above, the engine 9 uses lift-type valves for the intake and exhaust valves, and a valve timing which is a suitable for high-RPM, high-output engines. FIG. 6 illustrates the positions of these valves versus crank angle with the exhaust valve positions shown in the left curve (left of the top dead center crank position) and the intake valve position shown in the two curves on the right (following the top dead center position). During high-speed planing motion of the watercraft at high engine RPM as depicted by the solid-line curves in FIG. 6, the exhaust and intake valves operate with minimal overlap at the top dead center crank position. However, when the engine 9 is operated at lower RPM (during low- to mid-speed, non-planing motion) the valve timing control apparatus 31 causes earlier closure of the intake valves and lengthens the overlap period as shown by the broken-line intake valve curve in FIG. 6. This provides greater output of the engine at lower RPM's.

Figure 7:
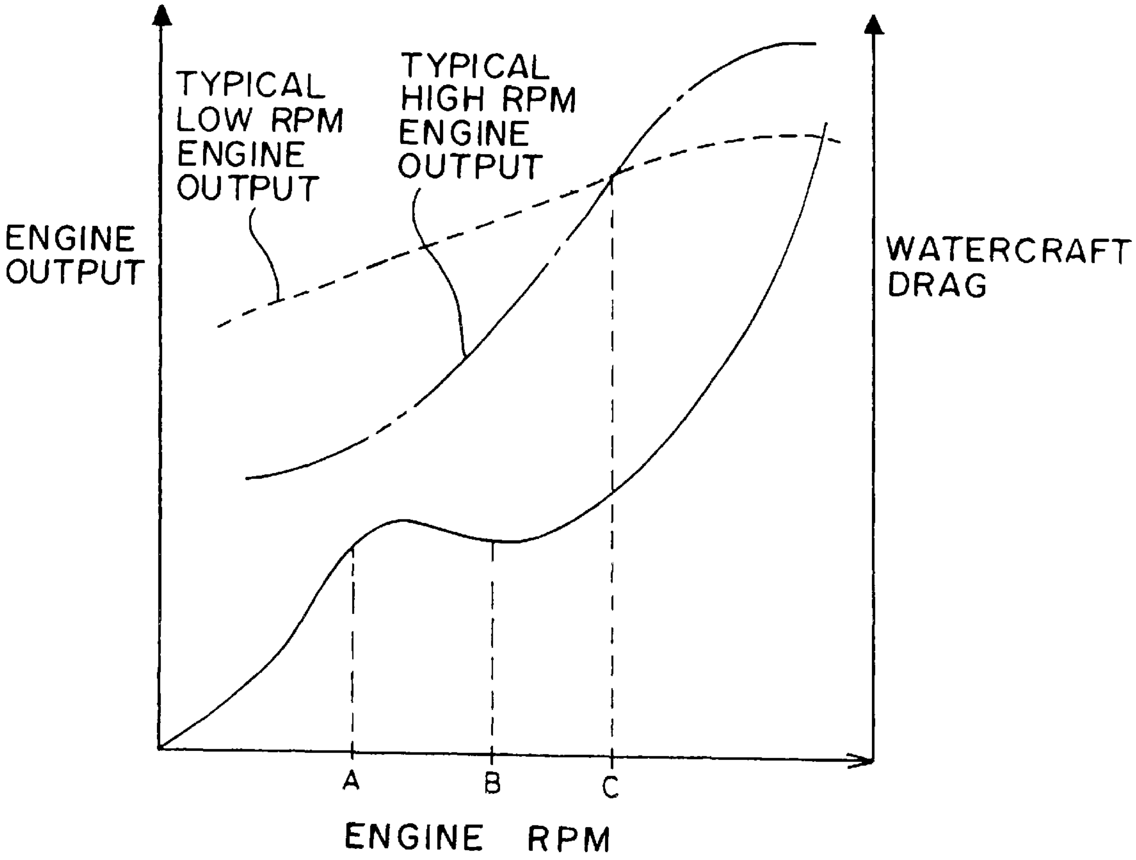
FIG. 7 is a graph showing the relationship between engine rpm, engine output, and water drag against the watercraft.

FIG. 7 illustrates engine output (in the broken-lines) and drag (in the solid-line) verses engine RPM (and watercraft velocity), for a typical watercraft 1. The solid-line drag curve illustrates how below speed A, the watercraft 1 operates in a non-planing mode where the bow of the watercraft 1 parts the water as it advances, similar to cruising mode for a water displacement craft. As its speed increases to speed B, the watercraft hull 6 begins planing over the surface of the water. During the transition from non-planing motion below speed A, to planing motion at and above speed B, the bow of the watercraft 1 gradually rises out of the water and drag increases until a hump is crossed between A and B. If the engine power output during the transition from non-planing to planing motion is insufficient, then the watercraft will be unable to move through the transition zone and into the planing mode at speed B or will transition too slowly.

As illustrated by the broken lines in FIG. 7, engine output generally increases with increasing engine RPM. However, as depicted by the evenly-spaced broken lines in FIG. 7, low-speed engines typically provide higher torque and power output at lower engine RPM than high-speeds high output engines. Conversely, high-speed engines generally provide higher output at higher engine RPM, as depicted by the unevenly-spaced broken lines in FIG. 7. Consequently, for engine RPMs below speed C, it is preferable to have an engine with low-speed engine output characteristics, while at speeds above speed C, it is preferable to have an engine with high-speed output characteristics.

Low-speed engine output characteristics can be obtained nevertheless from the high-RPM, high-output engine 9 by using the valve timing control apparatus 31 to advance the opening and closing time of the intake valves. Thus, engine speed C, where the low- and high-speed output engine lines cross, is the desired preselected RPM level at which the controller discussed above switches the solenoid 49 ON in order to enhance the low speed output of the engine. The solenoid 49 can also be switched ON at RPM level B when the watercraft 1 is moving through the transition zone from non-planing to planing motion. Thus, the high RPM high output engine 9 can be selectively controlled so as to produce sufficient output at lower engine speeds to move smoothly “over the hump” as the watercraft makes the transition from non-planing to planing operation.

Output of an engine of the type discussed is enhanced during low-and mid-speed operation by advancing the timing of the intake valves for several reasons. First, the timing change eliminates the blow-back of intake air into the combustion chamber following the intake stroke. Second, the longer exhaust valve overlap interval increases the exhaust pressure and internal exhaust gas recirculation (“EGR”) so as to reduce pumping losses when the pistons descend on the intake stroke. This latter effect is particularly important during non-planing operations when the exhaust outlet 19*a* is submerged underwater so as to increase the exhaust back pressure. The control apparatus 31 can also be set to exclude operation during certain periods, such as start-up or idling, in order to shorten the intake and exhaust valve overlap interval and improve engine performance during those periods.

Figure 8:
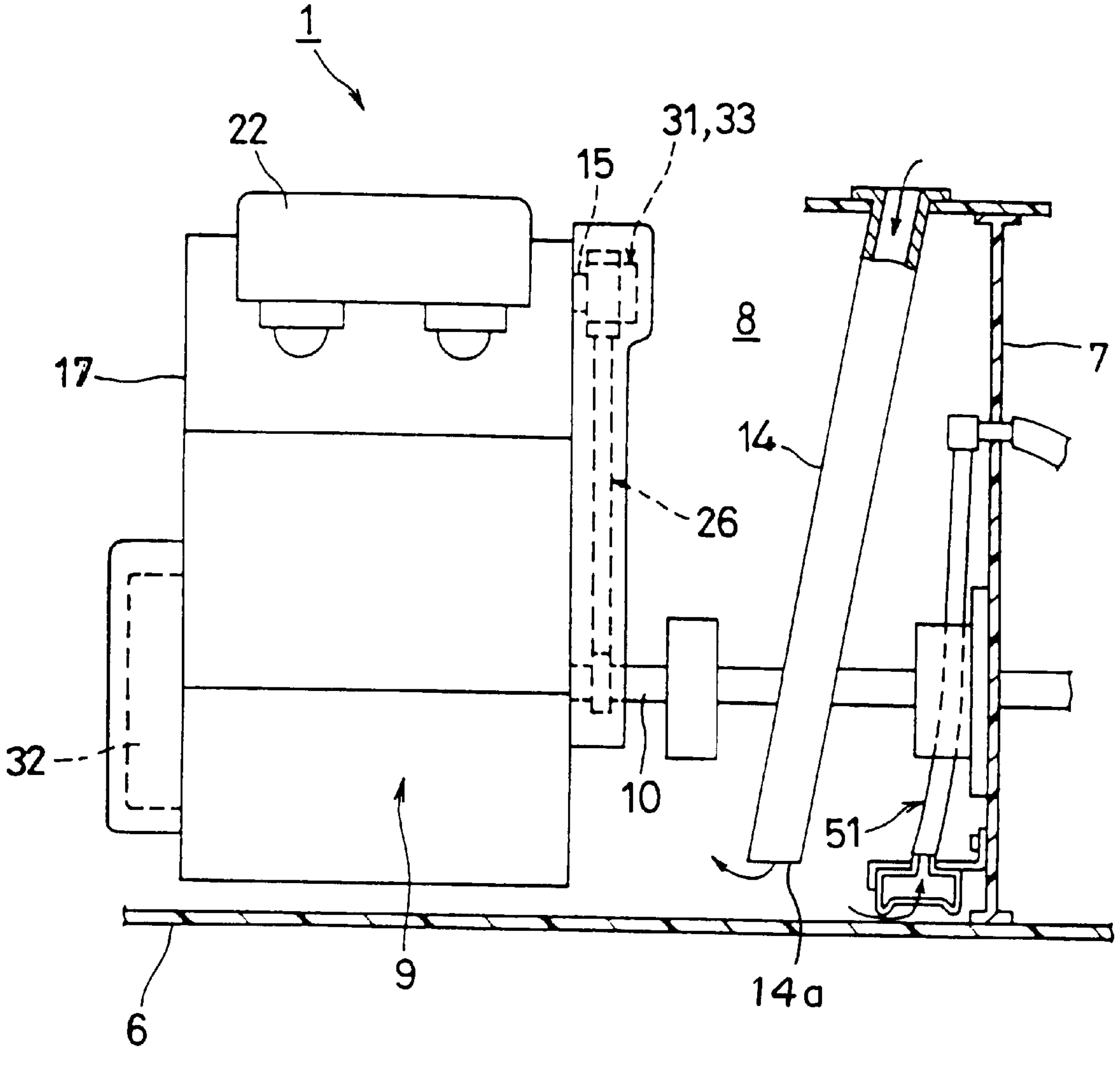
FIG. 8 is a partial sectional view of the engine compartment for another embodiment of the invention.

FIG. 8 illustrates another embodiment of the invention related to an engine compartment 8 of a small planing watercraft 1. In this embodiment, the valve timing control apparatus 31 is arranged on the intake valve camshaft 15 near the aft, or rear, side of the engine 9 relative to intake opening 23. Consequently, when the engine is running, air enters the engine compartment 8 from the exit 14*a* of the rear aft air intake duct 14 and cools the timing control apparatus 31 and control unit 33 as it is drawn towards and into the air intake opening 23 of the air intake silencer 22 (not shown and FIG. 8). FIG. 8, incidently, also illustrates a bilge pump apparatus 61 for removing water that collects at the bottom of the hull of the watercraft 1.

Figure 9:
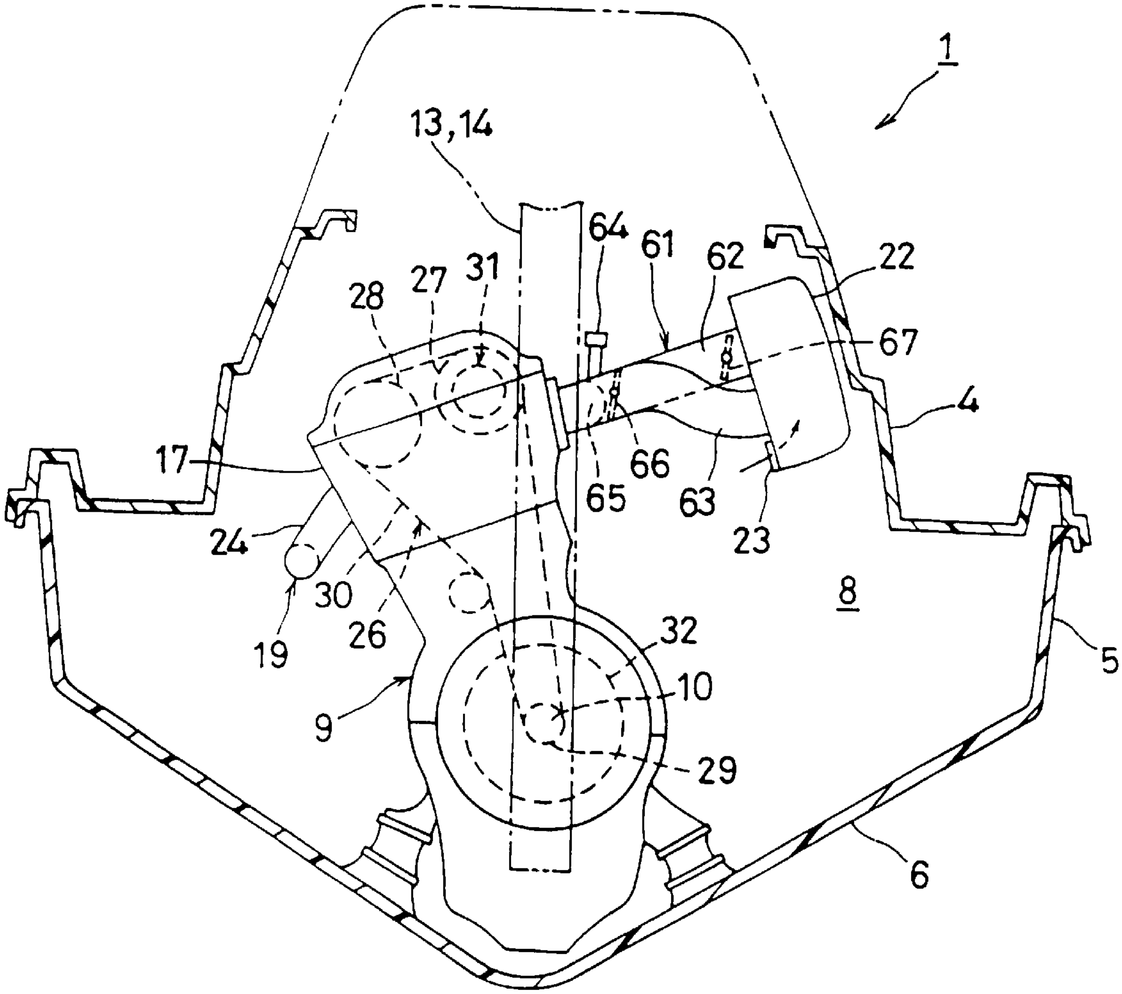
FIG. 9 is a transverse sectional view of the engine compartment of yet another embodiment of the invention.

FIG. 9 is a transverse sectional view of the engine compartment for another embodiment of a small planing watercraft 1. In this embodiment the engine block 9 is tilted laterally about its longitudinal axis so the cylinder head 17 is located towards one side of the engine fly wheel 32 and, the cylinder head 17 of the engine 9 is connected to the air intake silencer 22 by an intake manifold 61 which has a relatively short intake passage 62 for high-speed operations, and a relatively long intake passage 63 for low speed operations. In particular, the intake manifold 61 includes a substantially straight intake passage 62 for high-speed operations, and a longer S-shaped, or otherwise curved intake passage 63 for low-speed operations. Each of the intake passages 62 and 63 is connected at the engine at an area 65 where a fuel injector 64 sprays fuel into the intake air. As seen in FIG. 9, the tilted engine configuration provides ample space for the intake passages 62 and 63 on that side of the engine located further away from the wall of upper deck 4 without requiring enlargement of the engine compartment to accommodate the intake passages.

A throttle valve 66 is arranged in the low-speed intake passage 63, upstream from the connecting area 65. A similar throttle valve (not shown) is arranged in the high-speed intake passage 61 along with an air intake control valve 67 installed upstream of the throttle valve. The throttle valves 66 are opened and closed by a linkage to the throttle grip mounted on the handlebars 3 as shown in FIG. 1. The air intake control valve 67 is operated by an air intake valve controller (not shown) which senses the engine RPM from the crankshaft 10, camshaft 15, camshaft 16, or the engine ignition system. When the engine RPM is lower than that shown at C in FIG. 7, the air intake controller closes the air intake control valve 67. Conversely, the air intake control valve 67 is opened when the engine RPM is higher than speed C, indicating that the watercraft 1 is planing. During high-speed planing motion above speed C, the engine 9 will draw large volumes of air through the straight air intake passage 62. When the engine speed falls below the planing transition speed B, engine output is improved by taking advantage of the well known air intake inertia effect available in the longer air intake passage 63 and directing intake air through the longer passage.

Figure 10:
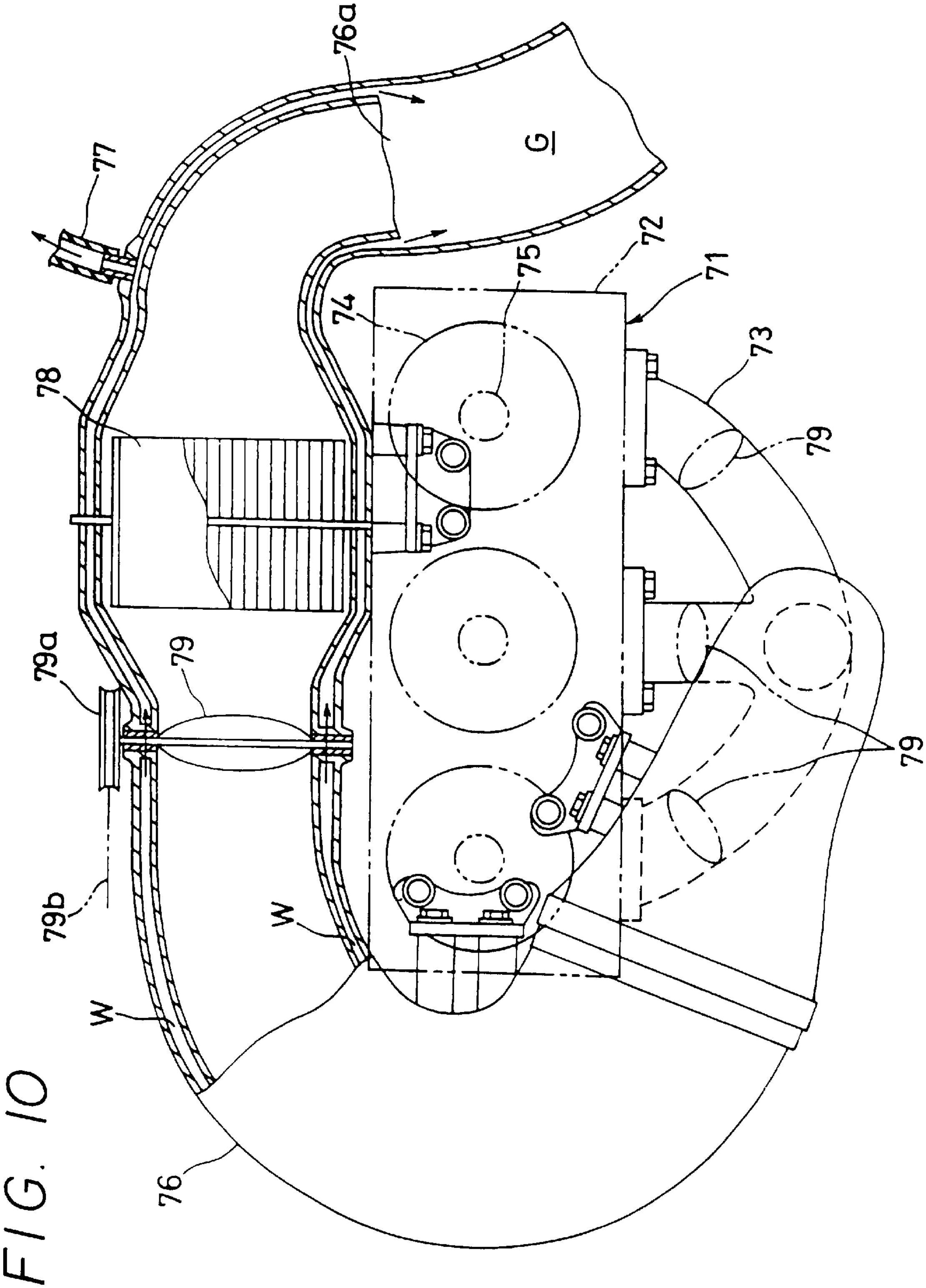
FIG. 10 is a sectional view of an exhaust system of yet another embodiment of the invention.

FIG. 10 illustrates an embodiment of an exhaust system for a small planing watercraft 1 including a water-cooled, four-cycle, three-cylinder engine 71 having a cylinder head 72 fitted with cylinder bores 74 and spark plugs 75. In FIG. 10, the port side of the cylinder head 72 is attached to the exhaust manifold 73 while the air intake system is arranged on the starboard side of the cylinder head. The exhaust manifold 73 merges the exhaust passages from each of the three cylinders 74 and leads to an exhaust pipe 76. The exhaust pipe 76 then extends along the starboard side of the watercraft 1 to the water lock 25 shown in FIG. 1. A coolant passage W is formed by a double-walled structure of the exhaust manifold 73 and extends from the coolant outlet 71 to area G midway down the exhaust pipe 76. After cooling the exhaust manifold 73 and exhaust pipe 76, the water in the coolant passage W is expelled into the area G, or through a water drain hose 77 leading outside the hull of the watercraft.

A catalyst 78 and exhaust control valve 79 are installed in the double-walled area of the exhaust pipe 76. Multiple exhaust control valves 79 may also be installed in the exhaust manifold 73 for each of the cylinders, as shown by the double-dashed lines in FIG. 10. The exhaust control valve(s) 79 is/are linked by a drive mechanism, including a pulley 79*a* and a cable 79*b,* to an exhaust valve controller (not shown). When the exhaust control valve 79 is partially closed, pressure waves propagating through the exhaust passage G are reflected off of the valve and back into the combustion chamber during the valve overlap interval. The exhaust valve controller partially closes the exhaust control valve 79 when the engine speed is less than speed C in FIG. 7, and opens the control valve 79 when the speed is higher than speed C. Consequently, when the watercraft is making the transition from non-planing to planing motion between speeds B and C, the exhaust valve 76 is closed, except for a small gap, until the engine reaches speed C when the valve is opened, or partially opened.

In this embodiment, when the engine rpm is high enough that the watercraft 1 begins planing, the exhaust control valve 79 is opened so as to lower the exhaust back pressure and obtain full high RPM power output. Conversely, when the engine speed is low and the watercraft 1 is operating in a non-planing or transition condition, the exhaust passage G is restricted so as to reflect the exhaust pressure waves and boost low RPM engine power as the watercraft 1 moves through the transition zone.

The invention described above offers numerous advantages over conventional small planing watercraft technology. For example, advancing the closure of the intake valves increases engine output at low speed by eliminating blowback at the end of the air intake stroke. Similarly, lengthening the overlap interval between the intake and exhaust valves increases the exhaust pressure and decreases the pumping loss during intake piston descent. Using an intake system with separate air intake passages for low- and high-speed operations takes advantage of the inertial effect of air moving through the longer passage to boost engine output under low speed conditions. Constriction of the exhaust passage by one or more exhaust control valves utilizes exhaust gas pressure waves in order to boost engine output at low speeds. Consequently, the high-speed, high output engine 9 has more power at lower RPM to move the watercraft smoothly and quickly over the hump in making the transition from non-planing to planing motion. Furthermore, by arranging the valve timing control apparatus between the opening of the main air intake duct of the hull and the engine air intake opening, the flow of air inside the engine compartment cools the valve timing control apparatus and improves its life. Likewise, the oil pressure control 34 is cooled by air moving over the control from aft air duct 14.

While the technology discussed above has been discussed with respect to various preferred embodiments and configurations, this description is merely illustrative of some of the many useful forms in which the invention might be reduced to practice by one of ordinary skill in the art. The scope of the protection for the invention is defined by the subject matter of the following claims when they are properly construed and interpreted in light of the description provided above.

What is claimed is:

1. A small planing watercraft having a piston-type internal combustion engine, said engine comprising a high speed-high output engine normally developing maximum power output at a relatively high RPM, said engine including an air intake opening and a rotatable intake valve camshaft actuating at least one intake valve of the engine, wherein said camshaft is driven in synchronous rotation by a camshaft driving device drivingly connected to a crankshaft of the engine and coupled to one end of the camshaft and further wherein said intake valve has normal opening and closing time intervals relative to engine piston and crankshaft positions, said normal opening and closing time intervals arranged to effect said high RPM-high output operating characteristics of said engine, the improvement comprising:

a variable intake valve timing device connecting the camshaft driving device to the camshaft and including an intake valve timing control device located adjacent to one end of the engine longitudinally spaced from said intake opening wherein intake air is caused to flow over the valve timing device en route to the engine air intake opening during engine operation;

said intake valve timing control device arranged so that during engine operation below a predetermined engine speed at which the engine develops less than maximum power output, the relative driving position of the camshaft driving device and the camshaft is selectively adjusted to advance the timing of the intake valve opening and closing relative to the camshaft driving device, and the relative driving position of the camshaft driving device and the camshaft is adjusted to restore the normal driving relationship between the camshaft driving device and the camshaft when the engine is operated at speeds above said predetermined speed;

whereby said engine may produce higher power output at operating speeds below said predetermined speed as compared with engine operating characteristics without advancement of intake valve opening and closing; and an outside air intake duct having an exit opening spaced away from said intake valve control device on a side thereof opposite the side toward which the engine intake opening is located, whereby intake air is caused to flow over the intake valve control device enroute to the engine air intake opening during engine operation.

2. The improvement as claimed in claimed in claim 1, wherein said camshaft driving device includes a toothed element drivingly connected to said one end of the engine intake valve camshaft and said variable intake valve timing system is actuatable via said control device to selectively rotate the toothed element relative to the camshaft.

3. The improvement as claimed in claim 2, wherein said annular toothed element includes internal longitudinal helical splines extending along an inner cylindrical circumferential surface of the element; and wherein said variable intake valve device includes an inner shaft fixed to and extending concentrically with said one end of said intake valve camshaft;

said inner shaft including outer helical splines extending axially over a peripheral surface thereof;

said inner splines of said toothed element and said outer splines on said inner shaft twisting relative to each other;

an annual sliding member located between said inner shaft and said inner cylindrical circumferential surface of said toothed element, said sliding member having axial splines on inner and outer peripheral surfaces thereof that are engaged with said splines of said inner shaft and said inner cylindrical circumferential surface of said toothed element; and a sliding member driving system operatively connected to the sliding member in a manner so that, upon actuation of the driving system, the sliding member is axially driven relative to the inner shaft and toothed element to thereby cause relative rotation between the toothed element and the camshaft.

4. The improvement as claimed in claim 3, wherein said annular member is a piston slidably mounted in said inner cylindrical surface of said toothed element and said sliding member driving system comprises a hydraulic circuit including a pressurized engine lubricating oil delivery conduit arranged to selectively deliver pressurized engine lubricating oil to at least one side of said piston to thereby cause its displacement relative to said cylindrical surface in a direction that advances the position of the camshaft relative to the toothed element;

said intake valve timing control device comprising a hydraulic pressure control device arranged to selectively supply pressurized engine lubricating oil to said at least one side of said piston and to selectively drain said pressurized hydraulic fluid away from said at least one side of said piston.

5. The improvement as claimed in claim 4, including a spring arranged to bias said piston towards a position at which the relative position of said toothed element and camshaft cause said normal opening and closing time intervals of said at least one intake valve.

6. The improvement as claimed in claim 4, wherein said engine lubricating oil delivery conduit extends longitudinally through said camshaft to an end thereof opposite the end to which the toothed element is affixed; and including a hydraulic pressure regulator located at said end of the camshaft opposite the end to which the toothed element is affixed, said pressure regulator arranged so that oil pressure is selectively controlled in said fluid delivery conduit in response to engine operating speed.

7. The improvement as claimed in claim 6, wherein said conduit in said camshaft contains lubricating oil circulating through and out of said conduit when said engine is operating, and an actuator for said hydraulic pressure regulator is arranged so that upon its actuation, circulation of said lubricating oil out of the conduit is blocked to increase the pressure of the oil in said conduit; said actuator arranged so that it is selectively electrically activated in response to engine operating speed above said predetermined speed.

8. The improvement as claimed in claim 3, wherein said inner splines of said toothed element and said helical splines of said inner shaft twist helically in opposite directions.

* * * * *